(12) United States Patent
Gelbart

(10) Patent No.: US 7,687,271 B2
(45) Date of Patent: Mar. 30, 2010

(54) COVERT AUTHENTICATION METHOD AND APPARATUS

(75) Inventor: Daniel Gelbart, Vancouver (CA)

(73) Assignee: Kodak Graphic Communications Canada Company, Burnaby, British Columbia (CA)

( * ) Notice: Subject to any disclaimer, the term of this patent is extended or adjusted under 35 U.S.C. 154(b) by 1182 days.

(21) Appl. No.: 10/829,368

(22) Filed: Apr. 22, 2004

(65) Prior Publication Data

US 2005/0239207 A1   Oct. 27, 2005

(51) Int. Cl.
*G01N 37/00* (2006.01)
(52) U.S. Cl. .............. 436/56; 422/82.05; 422/68.1; 422/50
(58) Field of Classification Search .............. 436/56, 436/27, 127; 380/23; 340/5.86; 382/175; 358/75, 501
See application file for complete search history.

(56) References Cited

U.S. PATENT DOCUMENTS

| | | | |
|---|---|---|---|
| 3,581,282 A | 5/1971 | Altman | |
| 3,636,318 A | 1/1972 | Lindstrom et al. | |
| 3,829,661 A | 8/1974 | Silverman et al. | |
| 3,999,042 A | 12/1976 | Silverman et al. | |
| 4,013,894 A | 3/1977 | Foote et al. | |
| 4,218,674 A * | 8/1980 | Brosow et al. | 340/5.86 |
| 4,245,213 A | 1/1981 | Kriger | |
| 4,253,017 A | 2/1981 | Whitehead | |
| RE31,211 E | 4/1983 | Whitehead | |
| 4,395,628 A | 7/1983 | Silverman et al. | |
| 4,476,468 A | 10/1984 | Goldman | |
| 4,527,051 A | 7/1985 | Stenzel | |
| 4,544,836 A | 10/1985 | Galvin et al. | |
| 4,599,509 A | 7/1986 | Silverman et al. | |
| 4,630,845 A | 12/1986 | Sanner | |
| 4,661,983 A | 4/1987 | Knop | |
| 4,785,290 A | 11/1988 | Goldman | |
| 4,820,912 A | 4/1989 | Samyn | |
| 4,926,031 A | 5/1990 | Stenzel | |
| 4,982,073 A | 1/1991 | Stenzel | |
| 5,023,923 A | 6/1991 | Sanner et al. | |
| 5,225,900 A * | 7/1993 | Wright | 358/501 |
| 5,235,166 A | 8/1993 | Fernadez | |
| 5,354,097 A | 10/1994 | Tel | |
| 5,396,559 A | 3/1995 | McGrew | |
| 5,434,917 A | 7/1995 | Naccache et al. | |
| 5,601,931 A * | 2/1997 | Hoshino et al. | 428/537.5 |
| 5,602,381 A | 2/1997 | Hoshino et al. | |
| 5,616,904 A | 4/1997 | Fernadez | |
| 5,619,025 A | 4/1997 | Hickman et al. | |
| 5,629,070 A | 5/1997 | Korth | |
| RE35,599 E | 9/1997 | Pease | |
| 5,682,103 A | 10/1997 | Burrell | |
| 5,719,939 A | 2/1998 | Tel | |
| 5,756,220 A | 5/1998 | Hoshino et al. | |
| 5,862,270 A | 1/1999 | Lopresti et al. | |
| 6,340,817 B1 | 1/2002 | Gelbart | |
| 6,549,131 B1 * | 4/2003 | Cote et al. | 340/572.1 |
| 6,565,002 B1 | 5/2003 | Tel | |
| 2002/0063744 A1 * | 5/2002 | Stephens, Jr. | 347/19 |

FOREIGN PATENT DOCUMENTS

| | | |
|---|---|---|
| EP | 0 237 815 B1 | 11/1992 |
| EP | 0 583 709 A1 | 2/1994 |
| EP | 0 656 607  * | 6/1995 |
| EP | 0 783 160 A2 | 7/1997 |
| JP | 08-194791 A2 | 7/1996 |
| JP | 09-179924 A2 | 7/1997 |
| WO | WO 95/30545 | 11/1995 |

OTHER PUBLICATIONS

Machine Translation of JP8-8-194791; Yasuo, Ishikawa, Patent Abstracts of Japan, 1996, pp. 1-9.*
Kaplan, Dana, Maximizing the Benefits of Brand Security—New Developments for Smart Protection, Spring 2003 (2003) PMPS Magazine, Spring 2003 Issue, retrieved from the Internet: http://www.Inksure.com/pdf/pmps.pdf entire document.

* cited by examiner

*Primary Examiner*—Walter D Griffin
*Assistant Examiner*—Christine T Mui
(74) *Attorney, Agent, or Firm*—Nelson Adrian Blish

(57) ABSTRACT

An authentication system uses the unique distribution of an invisible taggant as a "signature" to identify an item. The verification is error tolerant. The taggant is made visible to a camera by special illumination. Inert taggants, with no optical activity, can be made visible by their thermal properties.

15 Claims, 2 Drawing Sheets

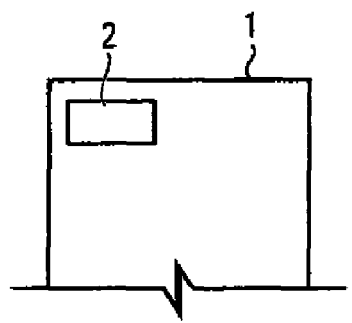
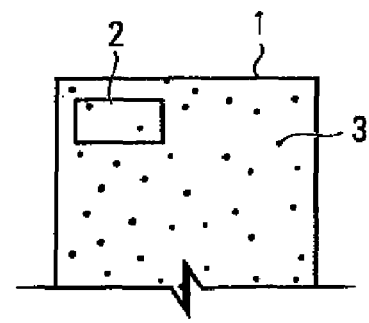
FIG. 1-a  FIG. 1-b
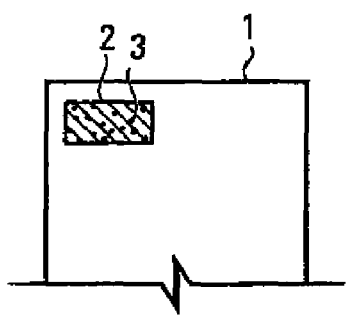
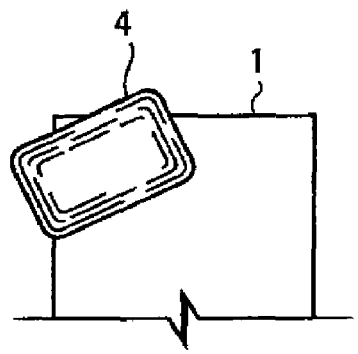
FIG. 1-c  FIG. 1-d
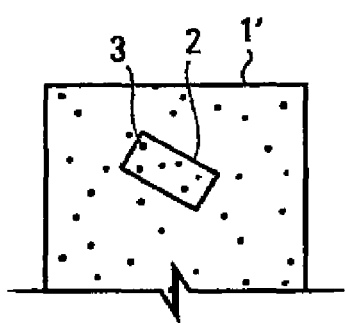
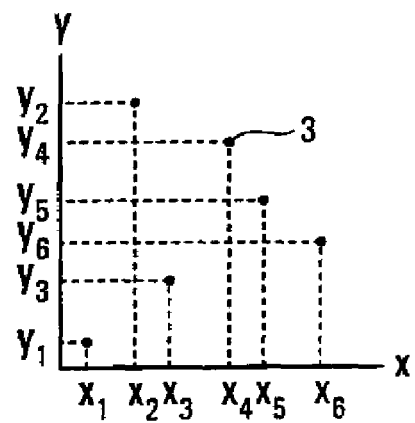
FIG. 1-e  FIG. 1-f

COVERT AUTHENTICATION METHOD AND APPARATUS

RELATED APPLICATIONS

No other applications relate.

FIELD OF THE INVENTION

The invention relates to authentication systems and to a field known as "security printing".

BACKGROUND OF THE INVENTION

There is a need to mark certain items to avoid counterfeiting. Marked items can be monetary tools such as banknotes, stamps, checks etc or government documents such as passports, visas etc. They can also be high value commercial items. Sometimes the authenticated items are pharmaceutical, to protect not only the monetary value but also the safety of the users. Most systems need to be verified by machine reading, sometimes through a wrapper or enclosure. One class of solutions uses a small amount of an additive, known as a taggant. The taggant can be detected with a specialized detector but is not visible under normal conditions. The advantage of a taggant is, besides being covert, is that it can be made machine-readable at high speeds. At very small doses it can be very difficult to find and identify, unless the specialized detector is used. The disadvantage of tagging is that it can carry a limited number of combinations, particularly if it has to be machine-readable. This does not allow giving each item a unique identification code or secure serial number (the visible serial number or barcode printed on most items can be easily counterfeit). To make it harder to counterfeit some systems use a random distribution of fibers or patterns, but because they rely on simple optical scanning for reading, a simple photocopy of the image will also read as genuine in most cases.

SUMMARY OF THE INVENTION

The invention relies on the random patterns created when a small quantity of a tagging powder, or taggant, is mixed with a material used in an item. The taggant can be dispersed in paper, printing inks, varnishes, paints, adhesives, plastics and even molten metals (as long as a taggant compatible with high temperatures is selected). The taggant is invisible to the eye (even under magnification) but can be made highly visible by creating the right conditions such as illumination with UV light, heating, chemical activation etc. When viewed under those conditions, a unique taggant image is captured from each item and stored in a database. When an item has to be authenticated, the taggant image is captured again and compared to the images stored in the database. Only items that match the database are recognized as genuine items. The degree of matching required does not have to be 100% as some of the taggant may be missing or masked. A preset threshold of matching can be used. Because of the uniqueness of each image, even less than full matching identifies the item with a high level of reliability.

BRIEF DESCRIPTION OF THE DRAWINGS

FIG. 1-a to FIG. 1-f show the steps required in creating and identifying a tagged item according to the invention.

DESCRIPTION OF THE PREFERRED EMBODIMENT

While the taggant can be detected by any physical or chemical property, such as light, magnetism, reactivity etc the preferred embodiment uses an optical method of detection. The main advantage of the optical detection method is that the unique image of the taggant distribution can be captured by a simple and inexpensive CCD or CMOS camera. In order to make the taggant invisible (unless the correct detector is used), a very fine powder is used in a very low concentration (down to a few parts per million). Such a powder, particularly if it has a color matching the background color, is very difficult to detect even by forensic methods.

In order to detect and capture the image of the powder it has to be made highly visible. This is achieved by a special detector. Typically, the detector will contain a shroud blocking ambient light or other electromagnetic radiation. Within the detector, a special environment is set up to make the powder highly visible relative to the background. By way of example, the taggant can be a fluorescent powder and the special environment making it highly visible is Ultra Violet (UV) light. Such fluorescent powders are widely used in fluorescent inks and markers, are readily available, stable and inexpensive. Particle size should be in the 5-50 μm range. If a higher level of security is required, the taggant can be a completely optically and chemically inert powder with thermal properties different from those of the background.

When exposed to a pulse of intense light (at almost any part of the spectrum) and viewed with a camera sensitive to the 5 μm 10 μm range of the IR spectrum, the taggant particles will appear brighter or darker than the background, depending on their thermal properties. The light pulse should have duration from 0.1 mS to 50 mS, preferable 1-5 mS, and the viewing should be within a few mS of the pulse. The camera used for viewing can be of the microbolometer type. The light source can be a standard camera electronic flash unit. By way of example, the taggant can be aluminum or stainless steel powder, glass or polystyrene microspheres, or alumina ($Al_2O_3$) powder. Materials heating up less than the background will show up as dark dots, materials heating up more will show up as light dots. Particle size should be in the 20-50 μm range. A very similar system used to detect small defects in copper traces is disclosed in U.S. Pat. No. 6,340,817 (having the same inventor and assignee as the current application).

Figure 2:
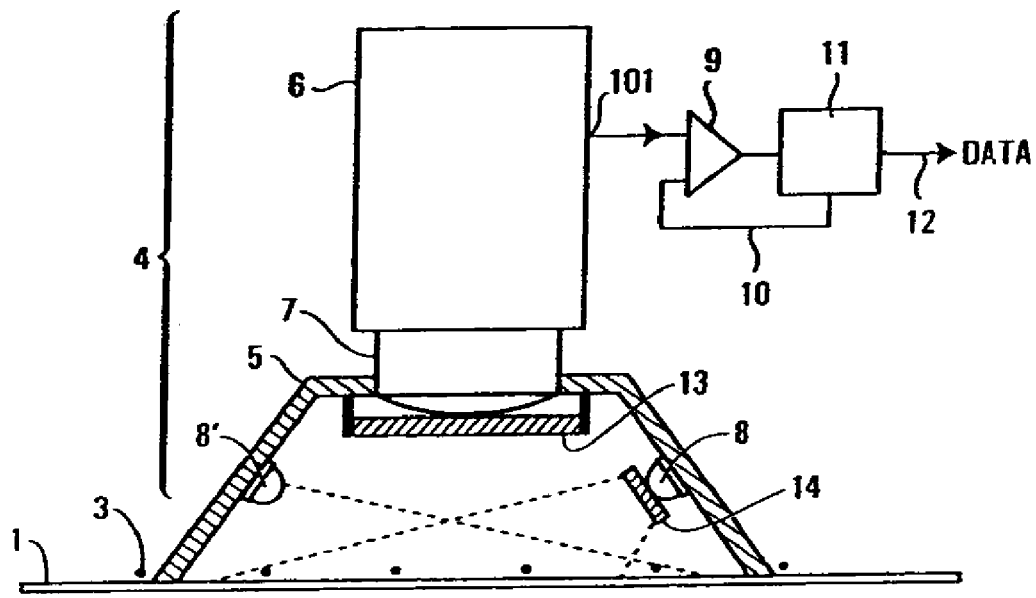
FIG. 2 shows the apparatus used to see and process the taggant image.

Further details on the construction of the detector are given in FIG. 2. An item 1, such as a printed label, is tagged by mixing taggant particles 3 in the substrate material or ink in order to permanently anchor the taggant to the substrate. Concentration can be as low as a few parts per million by weight. The detector 4 comprises of a camera 6, focused on the surface of item 1 using lens 7. An optical filter 13 blocks the excitation light, generated by pulsed source 8, from the camera. A shroud 5 blocks ambient light. The output of the camera 101 (typically NTSC video) is converted to a binary image using comparator 9. The threshold of comparator 9 is automatically set by processing unit 11 via feedback 10 to generate a fixed number of detected taggant particles (more details on this are given later). The output is fed as serial data stream 12, giving the coordinates of the taggant particles. Obviously, the data can be encrypted, if desired, for even greater security. For UV fluorescence, light source 8 is a high power UV LEDs (Nichia part # NCCU001E, 10 LEDs used in parallel) and filter 13 is an interference filter with a bandwidth and center wavelength matched to the fluorescent powder selected. Filters 14 block any light above a wavelength of 0.4 μm. For best results, yellow or red fluorescent powders are used, as many substrates have blue fluorescence used as a whitener (the colors mentioned refer to the emitted light, not to the color of the powder in the unexcited state, which is typically white). For the thermal taggants the light sources 8 are a camera flash unit and filter 13 is a long pass filter blocking any light below 3 μm. Filter 14 is a short pass filter blocking any light above 2 μm (in order to avoid blinding of the camera by the flash units). The camera is of the microbolometer type. By way of example, good results were obtained with an AGEMA microbolometer camera model 570 and a close-up lens. A second light source, 8', may be required if the registration mark (item 2 in FIG. 1) is not clearly visible under the illumination of filtered light source 8.

The steps needed to practice the invention are shown in FIG. 1. FIG. 1-*a* shows an item 1, by the way of example a document or a security label. A reference mark 2 is selected to register the taggant image. The edges of the item can also used as a reference, when nothing is printed on it. The reference mark can be a line, a company logo, a frame etc. In the normal mode the taggant is not visible. While item 1 was made (or printed) taggant 3 was added and the taggant distribution is shown in FIG. 1-*b*. FIG. 1-*b* visualized the distribution, which is not normally visible. The taggant 3 can also be added selectively, for example by mixing it only with a particular ink or varnish, as shown in FIG. 1-*c*. When the detector 4 is placed over item 1 it does not need to be aligned with it, as shown in FIG. 1-*d*., as long as it covers the area of interest. The camera in the detector sees the taggant 3 in the area of interest, frame 2, as shown in FIG. 1-*e*. The image appears rotated, as the detector was not aligned with item 1. The processor 11 in FIG. 2 includes software to recognize the reference mark 2 and rotate the image to align it with the horizontal and vertical axis (or any selected reference axis). The subsystem comprising the camera, lens, electronics and image registration and rotation software is available as a standard package from suppliers of machine vision systems. By the way of example, a compact package in the InSight product line made by Cognex (Natick, Mass.). As explained earlier, the processor output can set the threshold of the comparator 9 in FIG. 2 to always have the same number of taggant particles detected, in order to simplify the data base. Since the taggant particles have a distribution of sizes, changing the threshold changes the number of particles whose signal will exceed the threshold. A fixed threshold, variable particle count can also be used. The processed image appears in FIG. 1-*f*.

By way of example, the system was set to detect six particles of taggant 3 within the reference frame 2. The coordinates of each particle are sent out as x-y pairs, X1Y1; X2Y2; . . . X6Y6. The best number of particles depends on the size of the database, but a preferred range is from 2 to 100 particles. By way of example, if the camera has a resolution of 600×400 pixels and this is divided into a coarser grid of 256×256, the area of the reference frame 2 is about 100×100 pixels. With 6 particles this allows almost $(100\times100)^6=10^{24}$ different images. Even accepting partial matches of 5 out of the 6 particles, this allows billions of unique images. At the same time the image storage requirements and data transmission requirements (from the detector to the data base) are minimal, as each one of the six particles is defined by two bytes (XnYn) for a total of only 12 bytes of data—only 12 Gbytes for a billion images.

Figure 3:
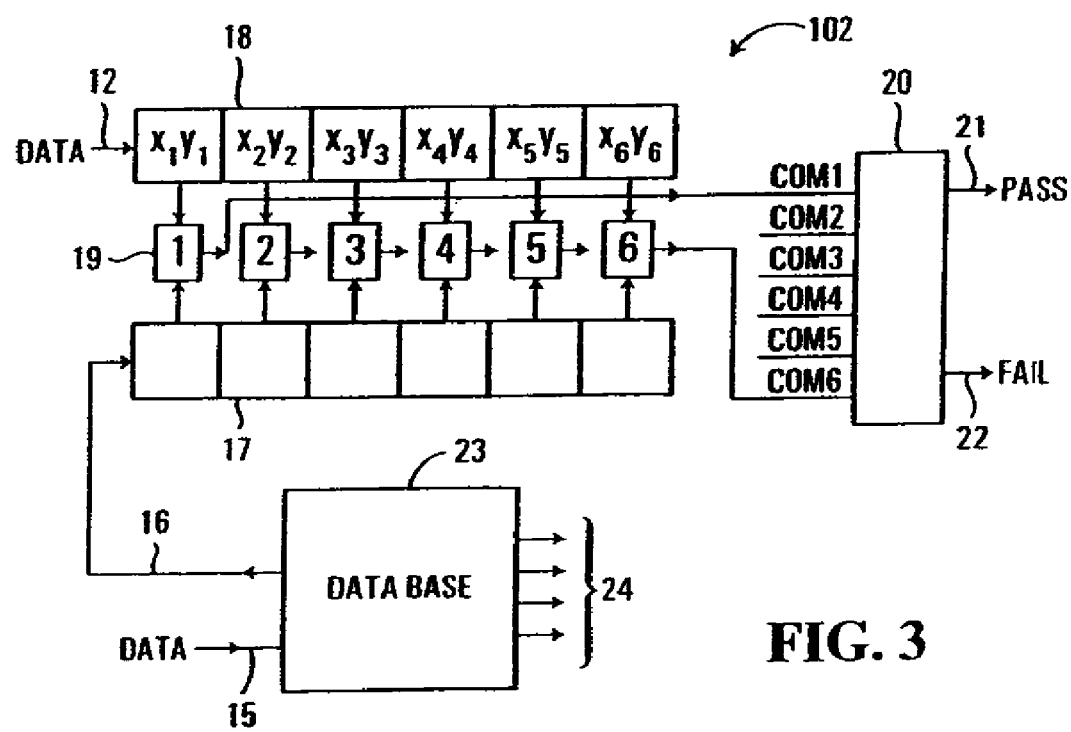
FIG. 3 shows schematically the method used to compare the taggant image to the images stored in the database.

The authentication process is shown schematically in FIG. 3. When each item is recorded into the database, it is read by the detector shown in FIG. 2 and the output data 12, which is 12 bytes in this example, is stored in the database 23 in FIG. 3. Since the images are random, they can be stored sequentially in the database; that is, there is no preferred order. For large databases, special algorithms can be used to "classify" the images for faster retrieval. When an item has to be authenticated (such as a passport at the border or a label on a product), the item is read by the detector and the processed taggant image (FIG. 1-*f*) is sent as data 12 from the detector to the verification unit 102 shown in FIG. 3. There the data 12 is stored in a register 18 and is compared to all the images or data 15 in the database 23 until a match is found. The images are read out 16 from database 23 into a register 17, and comparators 19 check for matches. In this example there are six comparators for the six taggant particles. The output of the comparators (COM1, COM2 . . . COM6) are fed to a logic circuit 20 which is programmed with the number of matches which have to be reached before a "Pass" signal 21 or "Fail" signal 22 is generated. For six particles, a good threshold is four or five matches. Requiring six matches will cause problems in cases that a taggant particle was obstructed, missing or not detected. The "Pass" signal can be sent back from the verification unit to the detector. The data links can be over phone lines, wireless, Internet or any other means. The required data rate is very low: to verify 100 items per second the data rate is only 100×12 bytes=1200 Bytes/sec in this example. For large databases and very rapid identification, at least part of database 23 has to be in Random Access Memory (RAM) as images have to be compared quickly. For increased throughput, the database can have multiple parallel ports 24, each connected to a different section, and all sections checked in parallel. This requires only the duplication of items 17,18, 19, 20, which are low cost items.

In some cases the dependence on a remote database is not desired and the system can be used in a "stand alone" mode. In this mode a code is printed on each item at the time it is read by the detector for the first time. This code is derived from the taggant location and can be as simple as the taggant coordinates XnYn or an encrypted version of it. Each time the item is read for authentication, a code is generated using the same rules and the code is compared to the code printed on the item. If they match, the item is authentic. Even if the code is copied onto a counterfeit item, it will not match the unique taggant distribution. If the code is machine readable, such as a barcode, the complete authentication process can be automated. Any combination of this "stand alone" mode and verification against a database can be used. For example, if the database if not functional, the "stand alone" mode can be used. The advantage of the database is that other information can be attached to each item in the database.

Clearly the high level of security this invention provides does not depend on the taggant used, only on the fact that it is nearly impossible to duplicate the random patterns it generates. Unlike other tagging systems, the security is not compromised even if the taggant is known and available to counterfeiters. What cannot be duplicated is the random distribution. The type of taggant used and method of detecting it is not important. The main reason for making the taggant invisible is in order not to alert anyone that an authentication system is used; when this is not an issue, the system can be simplified by using a visible taggant or applying a random pattern via spraying of paint etc. However, it is always more desirable to mix the taggant into one of the materials forming the item and making the taggant invisible to the human eye.

There have thus been outlined the important features of the invention in order that it may be better understood, and in order that the present contribution to the art may be better appreciated. Those skilled in the art will appreciate that the conception on which this disclosure is based may readily be utilized as a basis for the design of other compositions, elements and methods for carrying out the several purposes of the invention. It is most important, therefore, that this disclosure be regarded as including such equivalent compositions, elements and methods as do not depart from the spirit and scope of the invention.

What is claimed is:

1. An authentication method comprising the steps of:
   a. tagging an item by randomly distributing a taggant in at least part of the item, the taggant being invisible to an unaided human eye under normal conditions;
   b. optically detecting the random distribution of said taggant by:
      i. placing a detector in proximity to the item; and
      ii. generating data related to the taggant distribution coordinates; and
   c. verifying whether the data matches previous data from previously detected items.

2. A method as in claim 1 wherein the item is printed with a liquid, the liquid comprising printing ink and taggant.

3. A method as in claim 1 wherein the item includes a registration feature detectable by the detector.

4. A method as in claim 1 wherein the verifying step is invariant to the exact placement of the detector relative to the item.

5. A method as in claim 1 wherein the verifying step is tolerant to errors.

6. A method as in claim 1 wherein the verifying step comprises storing at least part of the previous data from previously detected items in RAM.

7. An authentication system for authenticating an item, the authentication system comprising:
   a. a fluorescent taggant invisible to the naked eye mixed with a material, at least a part of the item comprising the material;
   b. a detector capable of detecting location of the taggant without being required to contact the taggant;
   c. a database for storing taggant location coordinates from one or more items; and
   d. a verification unit for checking whether the item matches any of the one or more items in the database.

8. An authentication method comprising the steps of:
   a. tagging an item by randomly distributing a taggant in at least part of the item;
   b. detecting the taggant by:
      i. placing a detector in proximity to the item; and
      ii. generating first data related to taggant distribution coordinates;
   c. marking the item with a code related to the first data; and
   d. verifying the item at a future time by:
      i. placing a detector in proximity to the item;
      ii. generating second data related to the taggant distribution; and
      iii. comparing the second data to the marked code.

9. A detector for detecting invisible taggant in an item, the detector comprising of:
   a. an electronic camera capable of forming an image of a taggant distribution in the item;
   b. means of making the taggant detectable to the camera; and
   c. image processing means capable of:
      ii. detecting a registration mark on the item; and
      ii. registering the taggant distribution to the registration mark.

10. The authentication system of claim 7 wherein said detector is capable of optically detecting the random distribution of said taggant in said item, and said verification unit is capable of checking whether said item matches any of one or more items in the database from said optical detection of said random distribution.

11. The authentication method of claim 8 wherein the generating of first and second data is achieved by optically detecting said random distribution of said taggant.

12. The authentication method of claim 1 comprising rendering the distribution of said taggant detectable by said detector by irradiating said item with radiation.

13. The authentication system of claim 7 comprising a radiation source for rendering said taggant detectable by said detector.

14. The authentication method of claim 8 comprising rendering said taggant detectable by said detector by irradiating said item with radiation.

15. The detector of claim 9 wherein said means of making the taggant detectable to said camera comprises a radiation source.

\* \* \* \* \*